US010493511B2

(12) United States Patent
Noh

(10) Patent No.: US 10,493,511 B2
(45) Date of Patent: Dec. 3, 2019

(54) APPARATUS FOR MANUFACTURING ELBOW-SHAPED DUCT

(71) Applicant: Sung Keun Noh, Suwon-si (KR)

(72) Inventor: Sung Keun Noh, Suwon-si (KR)

( * ) Notice: Subject to any disclaimer, the term of this patent is extended or adjusted under 35 U.S.C. 154(b) by 386 days.

(21) Appl. No.: 15/510,682

(22) PCT Filed: Sep. 21, 2015

(86) PCT No.: PCT/KR2015/009863
§ 371 (c)(1),
(2) Date: Mar. 11, 2017

(87) PCT Pub. No.: WO2016/047974
PCT Pub. Date: Mar. 31, 2016

(65) Prior Publication Data
US 2017/0320119 A1    Nov. 9, 2017

(30) Foreign Application Priority Data

Sep. 22, 2014    (KR) .......................... 10-2014-0125664

(51) Int. Cl.
*B21D 51/16*    (2006.01)
*B21D 11/06*    (2006.01)
(Continued)

(52) U.S. Cl.
CPC ................ *B21D 11/06* (2013.01); *B21D 7/00* (2013.01); *B21D 11/08* (2013.01); *B21D 19/046* (2013.01); *B21D 39/02* (2013.01); *B21D 51/10* (2013.01)

(58) Field of Classification Search
CPC .......... B21D 11/06; B21D 7/00; B21D 11/08; B21D 19/046; B21D 39/02; B21D 51/10;
(Continued)

(56) References Cited

U.S. PATENT DOCUMENTS

| 4,378,934 A | 4/1983 | Tucker |
| 6,105,227 A * | 8/2000 | Bota ..................... B21C 37/104 |
| | | 29/33 K |

(Continued)

FOREIGN PATENT DOCUMENTS

| JP | 08294738 | 11/1996 |
| KR | 100599078 | 7/2006 |

(Continued)

*Primary Examiner* — David B Jones
(74) *Attorney, Agent, or Firm* — Patentfile, LLC; Bradley C. Fach; Steven R. Kick

(57) ABSTRACT

The objective of the present invention is to provide an apparatus for manufacturing an elbow-shaped duct, comprising: a main body obliquely provided at the upper part thereof; a duct movement guiding part provided to rotate and vertically move; a duct vane forming part including forming jigs symmetrically formed and respectively slid in the opposite directions to be coupled to and separated from each other; a duct vane coupling part including a duct fixing member for guiding the fixing of a duct and a duct vane pressing member for coupling upper and lower vanes of the duct; and a rotary driving part rotatably provided inside the main body, and including an eccentric rotary roller having, at the upper part thereof, a cutting roller for cutting the duct and a forming roller for forming the upper and lower vanes of the duct, thereby enabling the duct to be manufactured, by loading the cylindrical duct on the movement guiding part, as is, and simultaneously performing cutting and forming to correspond to an elbow shape, and thus remarkably reduces manufacturing time.

5 Claims, 17 Drawing Sheets

(51) Int. Cl.
*B21D 7/00* (2006.01)
*B21D 39/02* (2006.01)
*B21D 11/08* (2006.01)
*B21D 51/10* (2006.01)
*B21D 19/04* (2006.01)

(58) Field of Classification Search
CPC .......... B21D 51/04; B21D 53/06; B21D 5/01;
F16L 43/00; F24F 13/02; F24F 13/0245
USPC .......................................................... 72/135
See application file for complete search history.

(56) References Cited

U.S. PATENT DOCUMENTS

| | | | |
|---|---|---|---|
| 6,363,764 B1 * | 4/2002 | Bota | B21D 39/04 |
| | | | 72/115 |
| 6,378,184 B1 * | 4/2002 | Bota | B21C 37/104 |
| | | | 29/33 K |
| 7,096,585 B2 | 8/2006 | Bota | |
| 7,797,805 B2 * | 9/2010 | Rieck | B21C 37/125 |
| | | | 29/33 K |
| 9,561,536 B2 * | 2/2017 | Bota | B21D 51/10 |

FOREIGN PATENT DOCUMENTS

| | | |
|---|---|---|
| KR | 1020080081673 | 9/2008 |
| KR | 101128336 | 3/2012 |

* cited by examiner

APPARATUS FOR MANUFACTURING ELBOW-SHAPED DUCT

This Application is a 35 U.S.C. 371 National Stage Entry of International Application No. PCT/KR2015/009863 on Sep. 21, 2015, which claims the benefit of Republic of Korea Patent Application No. 10-2014-0125664, filed on Sep. 22, 2014, the entire disclosures of which are incorporated by reference herein.

TECHNICAL FIELD

The following disclosure relates to an apparatus for manufacturing an elbow-shaped duct, comprising: a main body (100) comprising a first support (110) obliquely disposed at an upper portion thereof and having a first hollow (111) formed at the center thereof, a second support (120) disposed thereinside and having a second hollow (121) formed at the center thereof, and an inclined housing tube (130) disposed over the second support (120), having a third hollow (131) formed at the center thereof, and comprising an inclined member (132) obliquely disposed at an upper portion thereof; a duct movement guiding part (200) disposed at a lower portion of the second support (120) so as to be rotatable and vertically movable and comprising a duct seating member (210) having a fourth hollow (211) formed at the center thereof; a duct vane forming part (300) disposed at an upper portion of the inclined member (132) and comprising forming jigs (320 and 320') symmetrically disposed to slide in the opposition directions, respectively, and comprising semicircular parts (310a and 310b) having a semi-circular shape and formed on respective facing surfaces; a duct vane coupling part (400) rotatably disposed at an upper portion of the first support (110) and comprising a duct fixing member (410) guiding fixing of a duct (10) and a duct vane pressing member (420) coupling upper and lower vanes (11 and 11') of the duct (10); and a rotary driving part (500) rotatably disposed inside the main body (100), and comprising a first driving member (510) obliquely disposed at an upper portion thereof and comprising an eccentric rotary roller (511) that comprises a cutting roller (511a) cutting the duct (10) and a forming roller (511b) forming the upper and lower vanes (11 and 11') of the duct (10) and a second driving member (520) disposed at a lower portion thereof and delivering a torque generated by driving of a motor part (not shown) to the first driving member (510), wherein the duct (10) is vertically seated on the duct seating member (210) to allow one side of the duct (10) to be cut into a narrow width and the other side to be cut into a wide width by sequential rising and rotation of the duct movement guiding part (200) and the eccentric rotary roller (511) that is obliquely disposed.

BACKGROUND ART

Generally, a duct is an air passage, i.e., a portion of air conditioning equipment which is manufactured as a duct connection tube for ventilation and circulation of air to protect a respiratory organ from interior contaminant materials such as fine dust, carbon dioxide, and harmful bacteria, especially, for a user who uses multi-use facilities such as public facilities, residences, and underground shopping areas.

These ducts become complicated and diversified in their structures due to convenience and design of facilities.

In accordance with the complicated structures of facilities as described above, the duct manufacturers are manufacturing various ducts such as circular ducts, T-shaped ducts, Y-shaped ducts, and elbow-shaped ducts in consideration of the purpose, use position, and size of the duct.

The Patent Document 1 entitled "apparatus and method for manufacturing spiral duct (Korean Patent No. 10-0599078)" discloses a kind of elbow-shaped duct. In this patent document 1, the apparatus for manufacturing a spiral duct includes a first edge forming roll for forming dual bent parts at both straight edges of a metal band, a cutting roll for cutting the metal band extracted from the first edge forming roll in a waved shape by periodically varying a horizontal rotation angle or in a straight shape in its longitudinal direction, and a seaming device for coupling a single bent part with the dual bent part winding the cut metal band in a spiral shape, and thus has an advantages in that since a horizontal rotation angle of a cutting roll is periodically varied to continuously cut a metal band along a straight line and a waved line, it is possible to form a duct in which straight connection ducts are integrally formed with a curved duct.

However, "the apparatus and method for manufacturing spiral duct" of Patent Document 1 are time consuming due to too many duct forming processes, and cannot be worked in a narrow space due to too many components.

Also, the metal band having a plate shape is cut into a straight line and a waved line, respectively, and the straight and waved metal bands are inserted into the seaming device one by one and then wound into a spiral shape to form the straight and waved metal bands into a cylindrical shape and couple the dual bent part and the single bent part into an integral duct. Accordingly, it is impossible to manufacture a duct formed into a cylindrical shape.

DISCLOSURE

Technical Problem

Accordingly, the present disclosure provides an apparatus for manufacturing an elbow-shaped duct, comprising: a main body obliquely provided at the upper part thereof; a duct movement guiding part provided to rotate and vertically move; a duct vane forming part including forming jigs symmetrically formed and respectively slid in the opposite directions to be coupled to and separated from each other; a duct vane coupling part including a duct fixing member for guiding the fixing of a duct and a duct vane pressing member for coupling upper and lower vanes of the duct; and a rotary driving part rotatably provided inside the main body, and including an eccentric rotary roller having, at the upper part thereof, a cutting roller for cutting the duct and a forming roller for forming the upper and lower vanes of the duct, thereby enabling the duct to be manufactured, by loading the cylindrical duct on the movement guiding part, as is, and simultaneously performing cutting and forming to correspond to an elbow shape, and thus remarkably reduces manufacturing time.

The present disclosure also provides an apparatus for manufacturing an elbow-shaped duct, which can reduce the labor cost by using the apparatus whose manufacturing process is integrated and which can manufacture an elbow-shaped duct even in a narrow space without a limitation of place through wholly automated processes.

Technical Solution

In one general aspect, an apparatus for manufacturing an elbow-shaped duct includes: a main body (100) comprising a first support (110) obliquely disposed at an upper portion thereof and having a first hollow (111) formed at the center thereof, a second support (120) disposed thereinside and having a second hollow (121) formed at the center thereof, and an inclined housing tube (130) disposed over the second support (120), having a third hollow (131) formed at the center thereof, and comprising an inclined member (132) obliquely disposed at an upper portion thereof; a duct movement guiding part (200) disposed at a lower portion of the second support (120) so as to be rotatable and vertically movable and comprising a duct seating member (210) having a fourth hollow (211) formed at the center thereof; a duct vane forming part (300) disposed at an upper portion of the inclined member (132) and comprising forming jigs (320 and 320') symmetrically disposed to slide in the opposition directions, respectively, and comprising semicircular parts (310*a* and 310*b*) having a semi-circular shape and formed on respective facing surfaces; a duct vane coupling part (400) rotatably disposed at an upper portion of the first support (110) and comprising a duct fixing member (410) guiding fixing of a duct (10) and a duct vane pressing member (420) coupling upper and lower vanes (11 and 11') of the duct (10); and a rotary driving part (500) rotatably disposed inside the main body (100), and comprising a first driving member (510) obliquely disposed at an upper portion thereof and comprising an eccentric rotary roller (511) that comprises a cutting roller (511*a*) cutting the duct (10) and a forming roller (511*b*) forming the upper and lower vanes (11 and 11') of the duct (10) and a second driving member (520) disposed at a lower portion thereof and delivering a torque generated by driving of a motor part (not shown) to the first driving member (510), wherein the duct (10) is vertically seated on the duct seating member (210) to allow one side of the duct (10) to be cut into a narrow width and the other side to be cut into a wide width by sequential rising and rotation of the duct movement guiding part (200) and the eccentric rotary roller (511) that is obliquely disposed.

The first driving member (510) may include: an eccentric shaft member (512) comprising an eccentric protrusion (512*a*) formed at a location eccentric from a rotation center of an upper part of the eccentric shaft member (512) and coupled to a central portion of the eccentric rotary roller (511) and a main shaft (512*b*) formed at a lower part of the eccentric shaft member (512); a rotary housing member (513) having a seating groove (513*a*) recessively formed in an upper part thereof to allow the eccentric rotary roller (511) to be seated therein and comprising a guide flange (513*b*) formed at a lower part thereof to allow the main shaft (512*b*) to be inserted therein; a first gear (514) disposed on a lower outer circumference of the guide flange (513*b*); a second gear (515) disposed on a lower outer circumference of the main shaft (512*b*); a third gear (516) disposed to operate in linkage with the first gear (514); a fourth gear (517) disposed to operate in linkage with the second gear (515); and a guide shaft (518) coupled to the third gear (516) and the fourth gear (517) and connected to the second driving member (520) to deliver a torque of the second driving member (520) to the guide flange (513*b*) and the main shaft (512*b*).

The first gear (514) and the third gear (516) may have a first gear ratio larger than a second gear ratio of the second gear (515) and the fourth gear (517) such that the second gear (515) further rotates a little more than the first gear (514) when the first gear (514) rotates one time.

The main body (100) may include a hydraulic reel member (140) that provides a hydraulic pressure for the duct fixing member (410) and the duct vane pressing member (420) such that the duct fixing member (410) and the duct vane pressing member (420) move forward and backward.

The apparatus may include shape forming members (321 and 321') recessively formed into a "U"-shape inside the semicircular parts (310*a* and 310*b*), and a forming guide jig (530) disposed at an upper part of the eccentric rotary roller (511) so as to be vertically movable and be movable forward and backward in a horizontal direction to support the inner circumferential surface of the duct (10) when the upper and lower vanes (11 and 11') of the duct (10) are coupled by the duct vane pressing member (420).

Other features and aspects will be apparent from the following detailed description, the drawings, and the claims.

Advantageous Effects

According to embodiments, an apparatus for manufacturing an elbow-shaped duct includes: a main body obliquely provided at the upper part thereof; a duct movement guiding part provided to rotate and vertically move; a duct vane forming part including forming jigs symmetrically formed and respectively slid in the opposite directions to be coupled to and separated from each other; a duct vane coupling part including a duct fixing member for guiding the fixing of a duct and a duct vane pressing member for coupling upper and lower vanes of the duct; and a rotary driving part rotatably provided inside the main body, and including an eccentric rotary roller having, at the upper part thereof, a cutting roller for cutting the duct and a forming roller for forming the upper and lower vanes of the duct, thereby enabling the duct to be manufactured, by loading the cylindrical duct on the movement guiding part, as is, and simultaneously performing cutting and forming to correspond to an elbow shape, and thus can remarkably reduce manufacturing time.

The apparatus for manufacturing an elbow-shaped duct can reduce the labor cost by using the apparatus whose manufacturing process is integrated and which can manufacture an elbow-shaped duct even in a narrow space without a limitation of place through wholly automated processes.

BEST MODE

Figure 1:
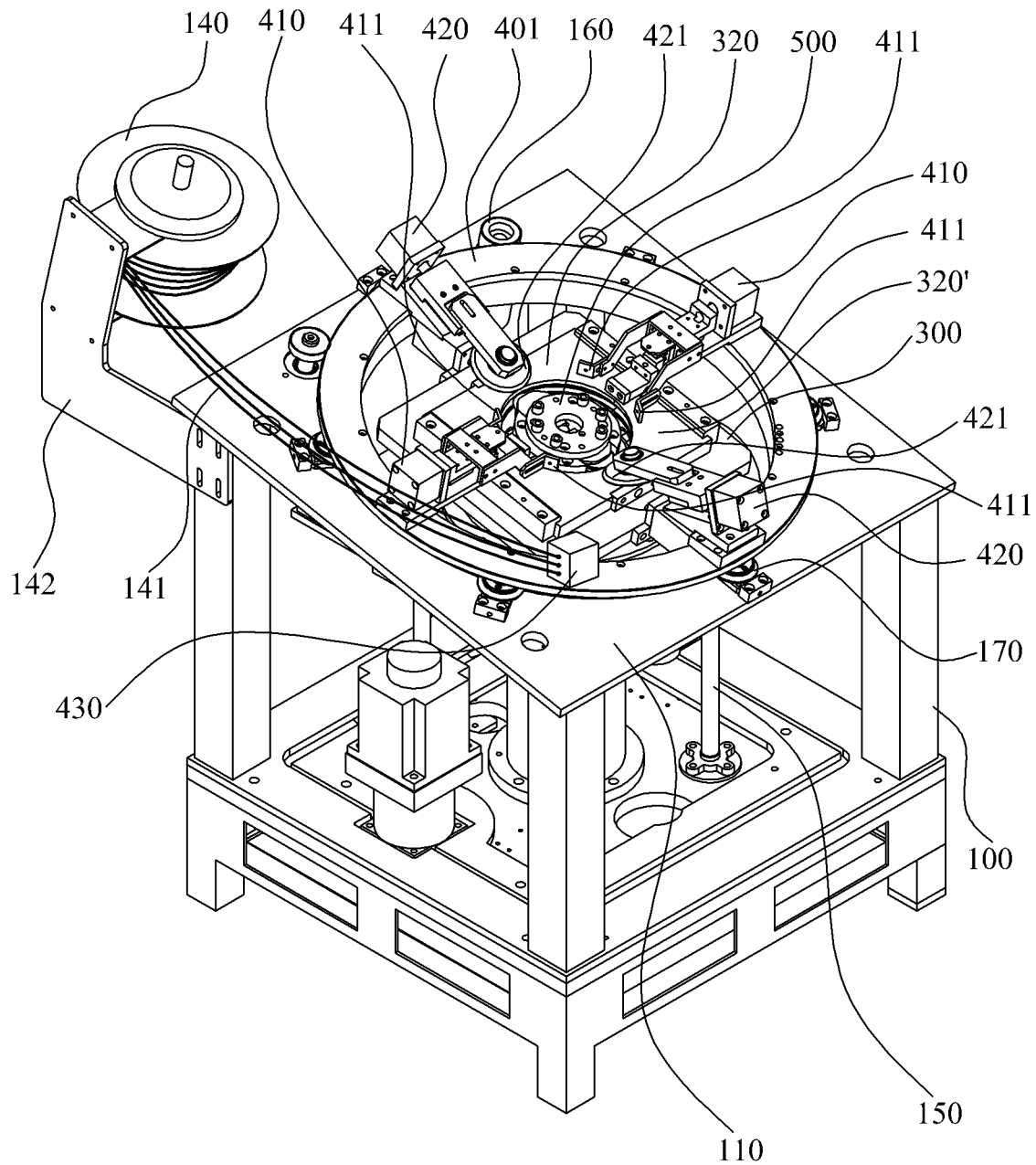
FIG. 1 is a perspective view illustrating the whole configuration of an elbow-shaped duct manufacturing apparatus according to an exemplary embodiment of the present invention.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, an elbow-shaped duct manufacturing apparatus 1 according to an embodiment of the present invention will be described in detail with reference to the accompanying drawings. First, it is also noted that like reference numerals denote like elements in the drawings. For explanation of the present invention, detailed descriptions related to well-known functions or configurations will be ruled out in order not to unnecessarily obscure subject matters of the present invention.

As shown in FIG. 1, the elbow-shaped duct manufacturing apparatus 1 may include a main body 100, a duct movement guiding part 200, a duct vane forming part 300, a duct vane coupling part 400, and a rotary driving part 500.

The elbow-shaped duct manufacturing apparatus 1 may be formed to include an external power supply unit, a sensor, a motor, a belt, and linked components. Since the operation principles of the above-mentioned components are well-known to those skilled in the art, detailed descriptions thereof will be omitted herein.

Also, it should be noted that a duct 10 is expressed as being manufactured into a cylindrical shape.

Also, it should be noted that FIGS. 11, 12, 15, and 16 are views illustrating a process of manufacturing an elbow-shaped duct 10 using forming jigs 320 and 320' and a eccentric rotary roller 511 and the forming jigs 320 and 320' and the eccentric rotary roller 511 are expressed as being in a horizontal state to help the understanding of the present invention even though the forming jigs 320 and 320' have to be correctly expressed as being in an inclined state.

Figure 2:
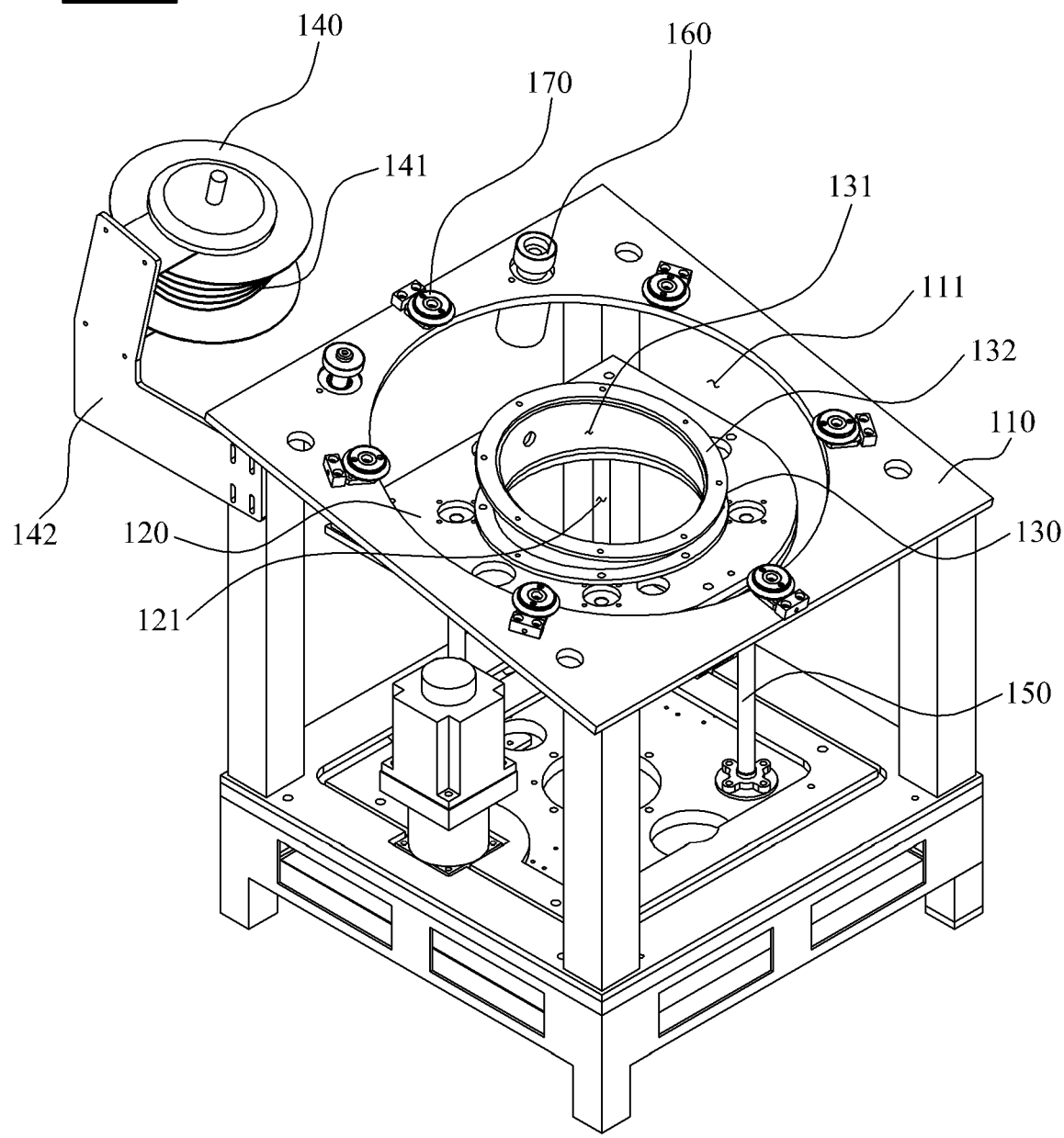
FIG. 2 is a perspective view illustrating a main body of an elbow-shaped duct manufacturing apparatus according to an exemplary embodiment of the present invention.

First, the main body 100 will be described. As shown in FIG. 1 or 2, the main body 100 may be a component acting as a frame to which the duct movement guiding part 200, the duct vane forming part 300, the duct vane coupling part 400, and the rotary driving part 500 described later are seated on and coupled to, and may include a first support 110, a second support 120, and an inclined housing tube 130.

The first support 110 may be disposed at an upper part of the main body so as to incline at a certain angle. Since the first support 110 is obliquely disposed, it is possible to maintain the work compatibility with the eccentric rotary roller 511 described later and obliquely disposed at a certain angle to cut the duct 10 in a diagonal direction.

Meanwhile, a first hollow 111 may be formed at the center of the first support 110 to provide a work space.

The second support 120 may be a component formed inside the main body 100 and having a plate shape. The second support 120 may have a second hollow 121 to be formed at the center thereof and enable a duct seating member 210 to lead in and withdraw from the second hollow 121.

On the other hand, one or more movement guiding shafts 150 having a long bar shape may be formed under the second support 120, and may be fixed to a lower portion of the main body 100 such that the second support 120 is installed in the air inside the main body 100.

The inclined housing tube 130 may be a component disposed over the second support 120. The inclined housing tube 130 may have a third hollow 131 to be formed at the center thereof and enable the duct seating member 210 to lead in and withdraw from the third hollow 131.

Also, an inclined member 132 having a ring shape may be obliquely disposed over the inclined housing tube 130 to extend in an outer direction from the outer circumference such that the duct vane forming part 300 is seated thereon and coupled thereto. Thus, the duct vane forming part 300 can be disposed in an inclined state.

In this case, the first support 110 and the inclined member 132 may be formed so as to incline at the same angle.

A hydraulic reel member 140 may be disposed at one side of the upper part of the main body 100 to provide a hydraulic pressure for forward and backward operations of the duct fixing member 410 and the duct vane pressing member 420 of the duct vane coupling part 400. The hydraulic reel member 140 may include a reel 141, and the reel 141 may be connected to a hydraulic control member 430 that is organically-operably connected to the duct fixing member 410 and the duct vane pressing member 420, and may operate the duct fixing member 410 and the duct vane pressing member 420 in accordance with the operation of a controller (not shown).

The hydraulic reel member 140 may be connected to 142 that is fixedly installed at one side of the upper part of the main body 100, and thus may rotate in a forward or backward direction in accordance with the operation of the controller (not shown). Thus, it may be possible to smoothly perform the winding and unwinding of the reel 141.

Also, a first rotating gear 160 may be disposed over the first support 110, and thus may enable a circular rotation plate 401 of the duct vane coupling part described later to rotate in a forward or backward direction.

Also, at least one guide gear 170 may be disposed over the first support 110, and thus may guide the stable rotation of the circular rotation plate 401.

Figure 3:
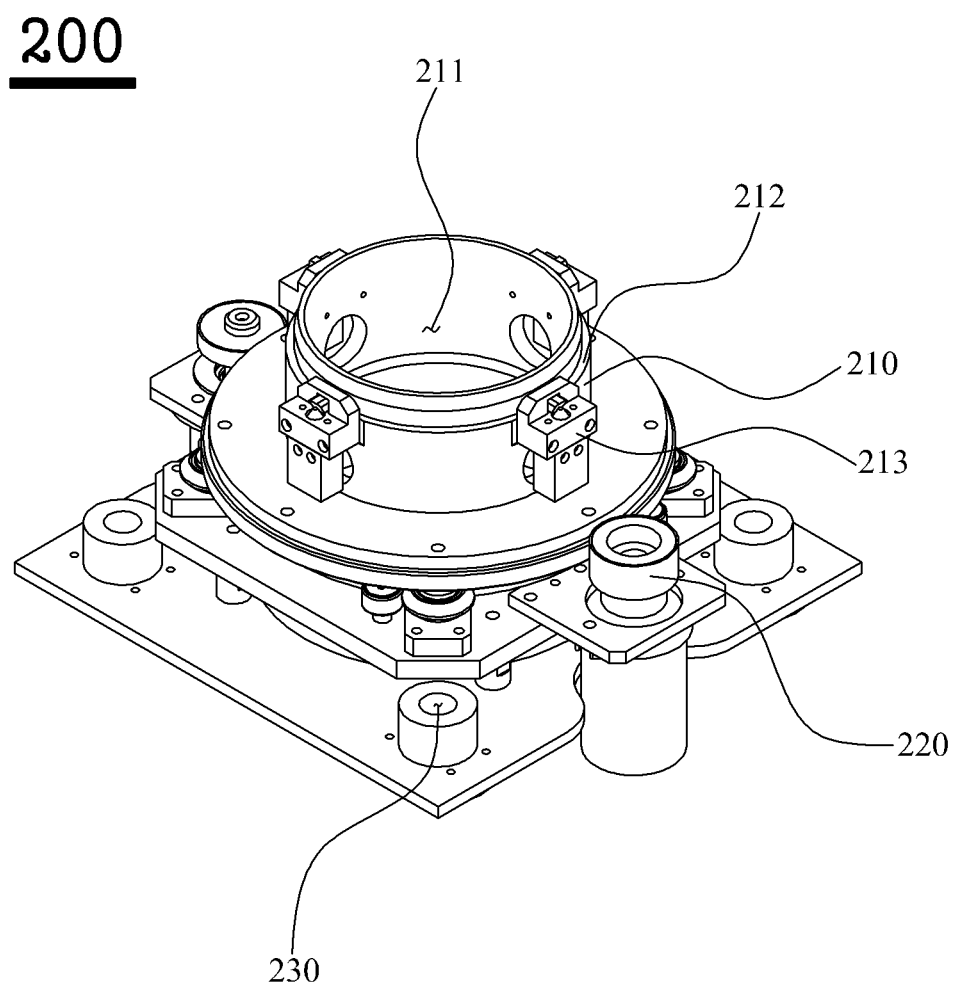
FIG. 3 is a perspective view illustrating a duct movement guiding part of an elbow-shaped duct manufacturing apparatus according to an exemplary embodiment of the present invention.
Figure 7:
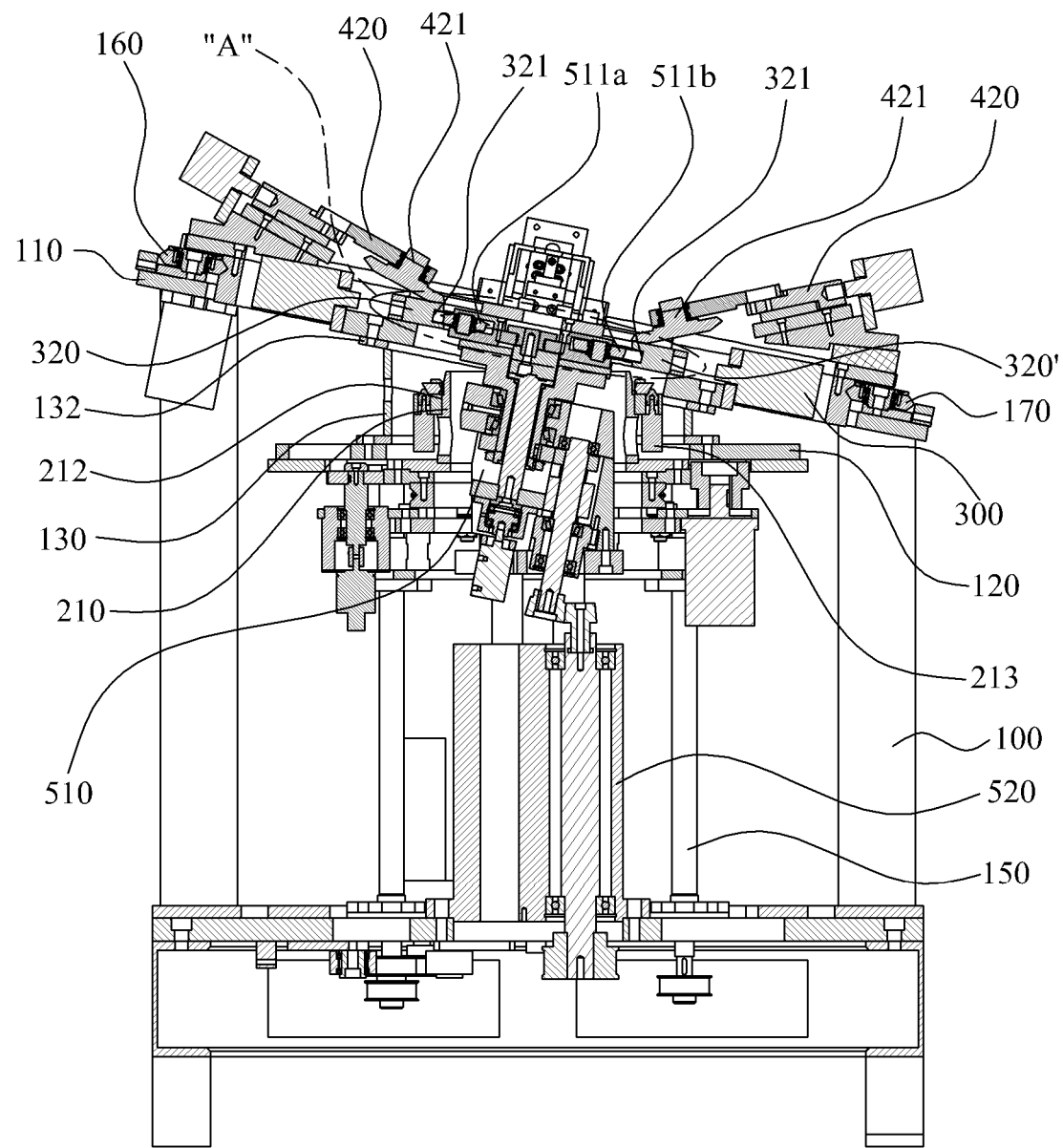
FIG. 7 is a cross-sectional view illustrating an elbow-shaped duct manufacturing apparatus viewed from the lateral side thereof according to an exemplary embodiment of the present invention.

Hereinafter, the duct movement guiding part 200 will be described in detail. As shown in FIG. 3 or 7, the duct movement guiding part 200 may be a component that is disposed under the second support 120 so as to rotate and vertically move, and may include a duct seating member 210 and an insertion hole 230.

The duct seating member 210 may have a fourth hollow 211 formed at the center thereof to enable a first driving member 510 to be obliquely disposed and operated inside the fourth hollow 211.

A duct seating step 212 may be formed on the upper part of the duct seating member 210, and thus the lower part of the duct 10 introduced through third hollow 131 may be seated on the duct seating step 212.

Also, a duct separation preventing member 213 may be disposed outside the duct seating step 212 to support the lower part of the duct 10 and fix the duct 10 even though the duct movement guiding part 200 rotates and vertically moves.

Also, a second rotating gear 220 may be disposed outside the duct seating member 210, and thus may enable the duct seating member 210 to rotate in a forward or backward direction.

Meanwhile, at least one insertion hole 230 may be formed in the duct movement guiding part 200 to receive the movement guiding shaft 150. Thus, when the duct movement guiding part 200 is vertically moved by the controller (not shown), the duct movement guiding part 200 may be stably moved in a vertical direction by the movement guiding shaft 150.

Figure 4:
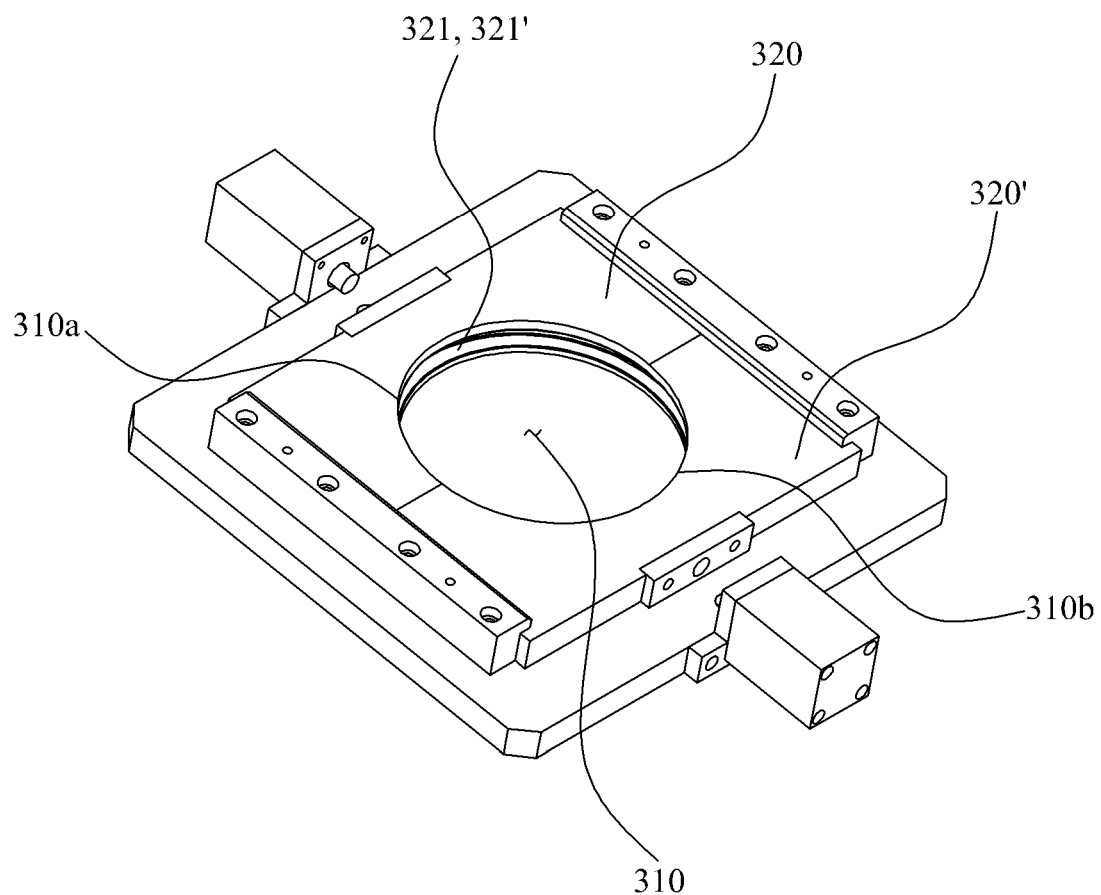
FIG. 4 is a perspective view illustrating a duct vane forming part of an elbow-shaped duct manufacturing apparatus according to an exemplary embodiment of the present invention.
Figure 8:
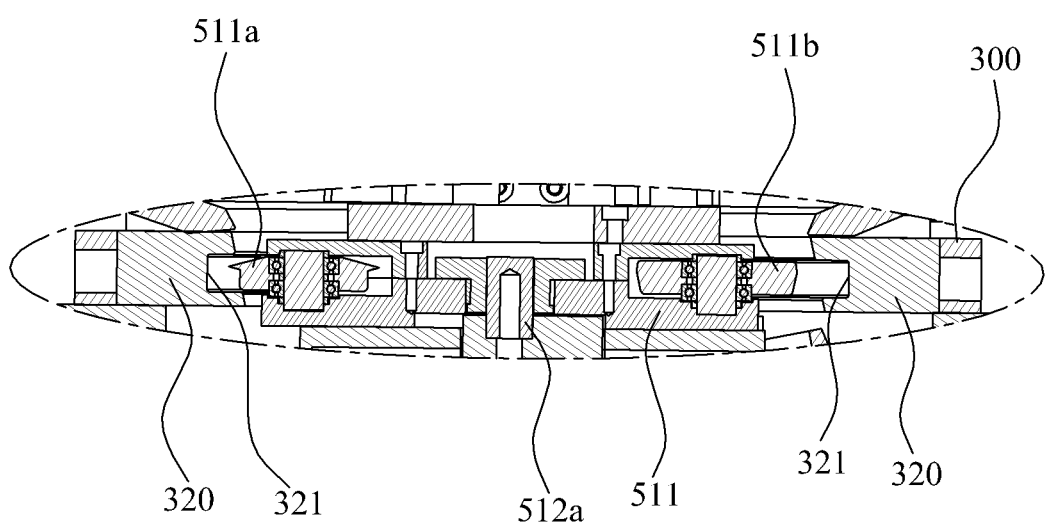
FIG. 8 is a magnified view illustrating a portion "A" of FIG. 7.

Hereinafter, the duct vane forming part 300 will be described in detail. As shown in FIGS. 1, 4, and 8, the duct vane forming part 300 may be a component that is coupled to the upper part of the inclined member 132 and forms the shape of upper and lower vanes 11 and 11' of the duct 10, and may include forming jigs 320 and 320' and shape forming members 321 and 321'.

The forming jigs 320 and 320' may include semicircular parts 310a and 310b which divide the fifth hollow 310 into half, respectively, and may be symmetrical to each other. The forming jigs 320 and 320' may be coupled to each other when the upper and lower vanes 11 and 11' of the duct 10 are formed and may be separated from each other when the forming of the upper and lower vanes 11 and 11' of the duct 10 is completed, by respectively sliding in the opposite directions.

Figure 5:
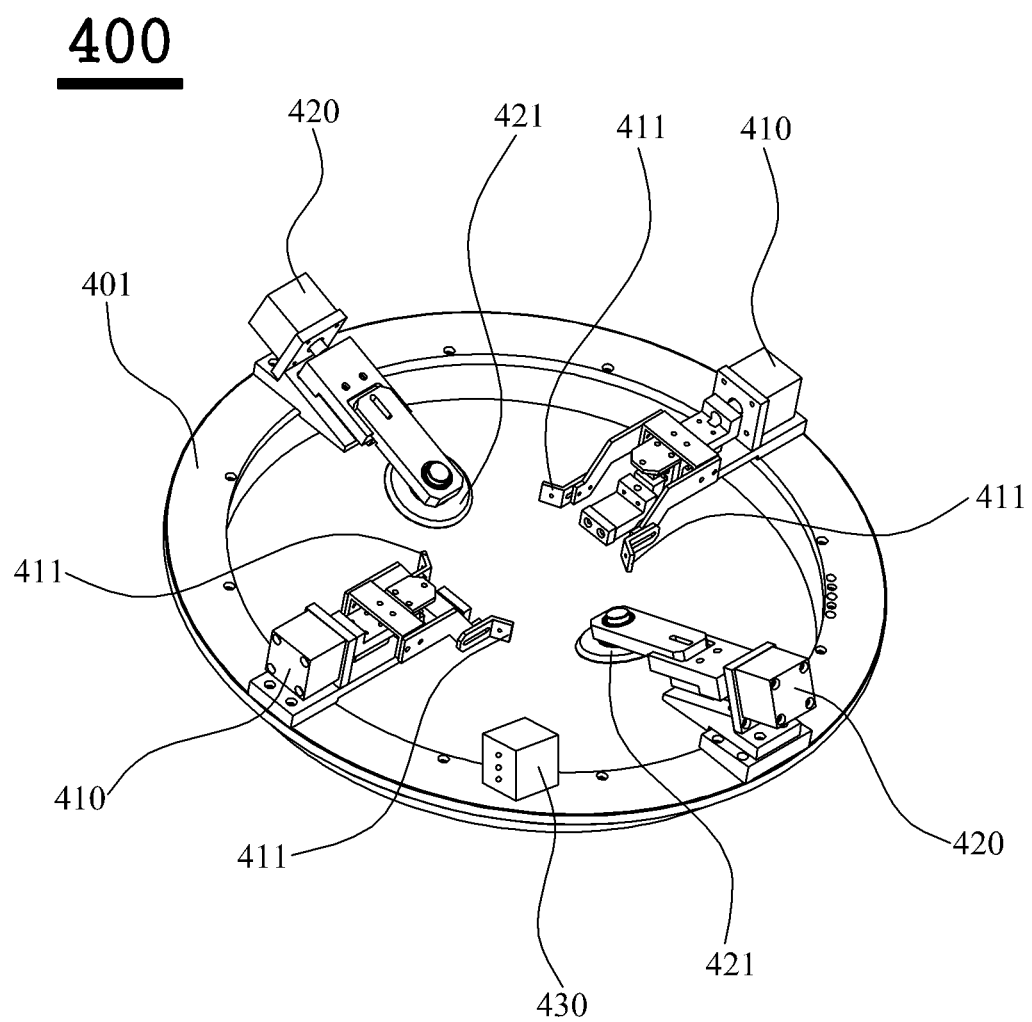
FIG. 5 is a perspective view illustrating a duct vane coupling part of an elbow-shaped duct manufacturing apparatus according to an exemplary embodiment of the present invention.

The shape forming members 321 and 321' may be recessively formed into a "U" shape inside the semicircular parts 310a and 31b, respectively. The shape forming members 321 and 321' may form the upper and lower vanes 11 and 11' of the duct 10 when the duct 10 cut by a cutting roller 511a described later is received and pressed in the shape forming members 321 and 321' by a forming roller 511b described later. Hereinafter, the duct vane coupling part 400 will be described in detail. As shown in FIGS. 1, 5, and 8, the duct vane coupling part 400 may be rotatably disposed over the first support 110, and may include a circular rotation plate 401, a duct fixing member 410, a duct vane pressing member 420, and a hydraulic control member 430.

The circular rotation plate 401 may have a ring shape which has a through hole formed at the center thereof. Connection sawteeth (not shown) may be formed on the outer circumference of the circular rotation plate 401 to engage with the first rotating gear 160, and thus the circular rotation plate 401 may be rotate in accordance with the rotation of the first rotating gear 160.

The duct fixing member 410 may be provided in plurality, and may move forward and backward by the hydraulic control member 430 to fix and release the duct 10. When the duct 10 seated on the duct movement guiding part 200 moves upward for the forming of the upper and lower vanes 11 and 11' of the duct 10 in accordance with the operation of the controller (not shown), the duct fixing member 410 may guide the duct 10 that is moved upward, thereby enabling more precise forming of the upper and lower vanes 11 and 11' of the duct 10.

In this case, a binding member (not shown) such as silicone may be provided on the end portion of a support bracket 411 holding the duct 10 in order to increase a frictional force with the duct 10.

The duct vane pressing member 420 may be provided in plurality, and may move forward and backward by the hydraulic control member 430 to couple the upper and lower vanes 11 and 11' of the duct 10. Also, a pressing roller 421 may be rotatably disposed on the front end of the duct vane pressing member 420. When the duct vane pressing member 420 moves forward while the upper vane 11 of the duct 10 is seating on the lower vane 11', the pressing roller 421 may push and press a vertical portion of the lower vane 11' of the duct 10 in a forward direction, and when the circular rotation plate 401 rotates, the pressing roller 421 may rotate around the duct 10 while pressing the vertical portion of the lower vane 11' of the duct 10. Thus, the upper vane 11 and the lower vane 11' of the duct 10 may be pressed and coupled with high airtightness.

In this case, as shown in FIG. 12H, the lower circumference of the pressing roller 421 may be formed to be parallel to the upper portions of the forming jigs 320 and 320'.

Figure 6:
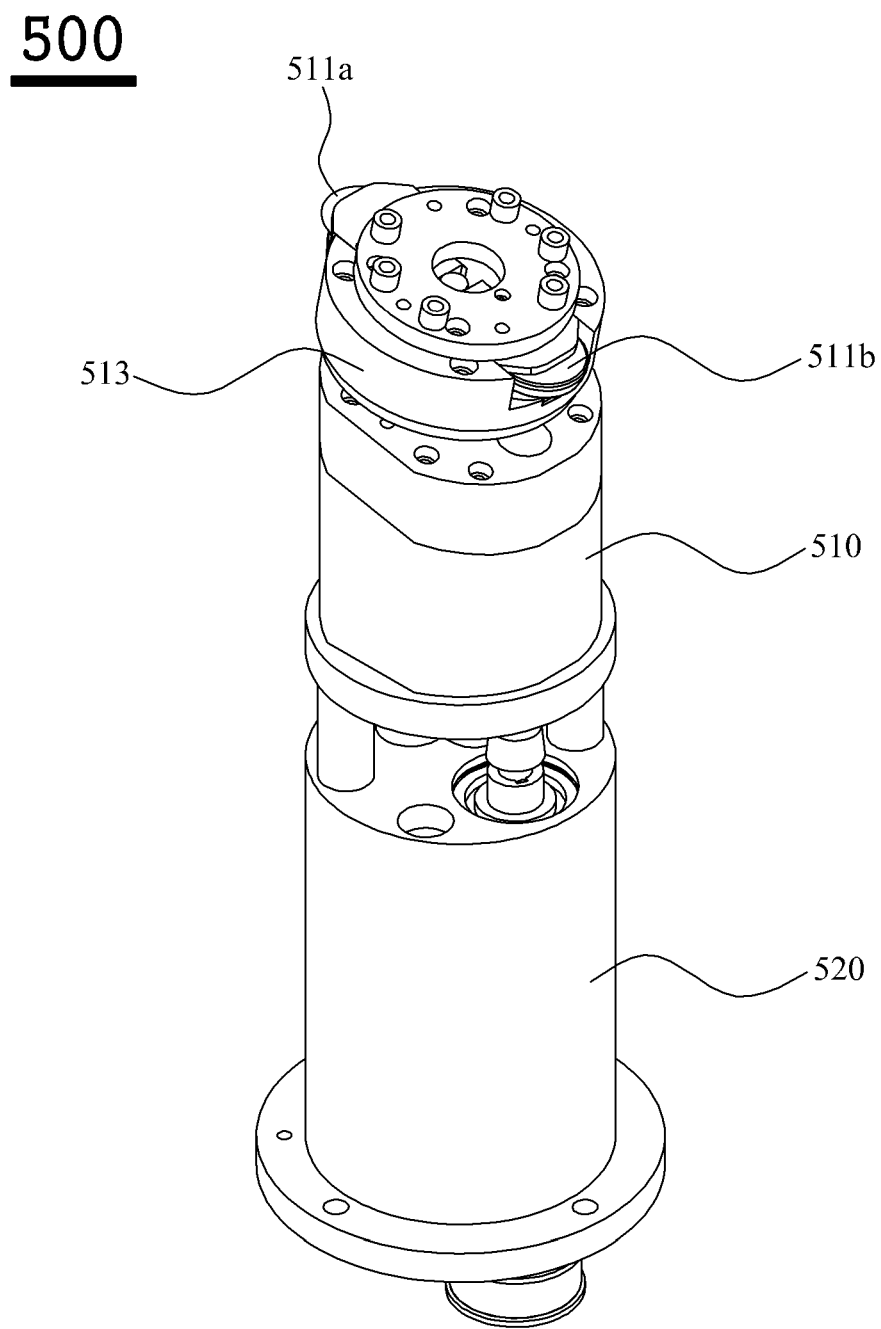
FIG. 6 is a perspective view illustrating a rotary driving part of an elbow-shaped duct manufacturing apparatus according to an exemplary embodiment of the present invention.
Figure 9:
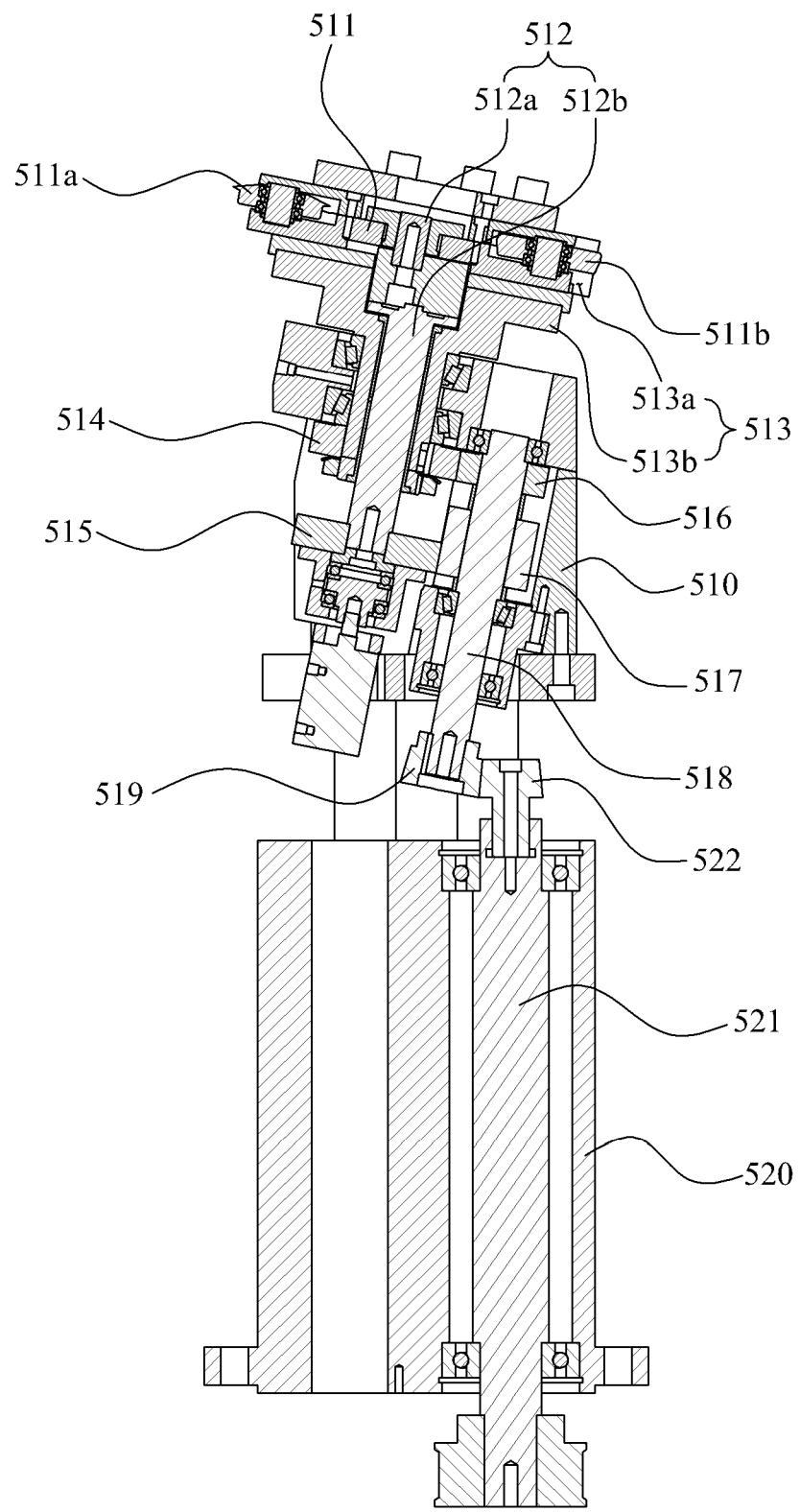
FIG. 9 is a cross-sectional view illustrating a rotary driving part of an elbow-shaped duct manufacturing apparatus viewed from the lateral side thereof according to an exemplary embodiment of the present invention.

Hereinafter, the rotary driving part 500 will be described in detail. As shown in FIG. 6 or 9, the rotary driving part 500 may be a component that cuts one side surface of the duct 10 into a narrow width and cuts the other side surface of the duct 10 into a wide width, and simultaneously forms the shapes of the upper and lower vanes 11 and 11' of the duct 10. The rotary driving part 500 may include a first driving member 510 and a second driving member 520.

The first driving member 510 may be a component that is obliquely disposed inside the second to fifth hollows 121, 131, 211 and 310, and may include an eccentric rotary roller 511, an eccentric shaft member 512, a rotary housing member 513, and a guide shaft 518.

The eccentric rotary roller 511 may include a cutting roller 511a disposed at one side thereof and cutting the duct 10, and a forming roller 511b disposed at the other side thereof and guiding the forming of the upper and lower vanes 11 and 11' of the duct 10. The eccentric rotary roller 511 may be located at the fifth hollow 310 and may operate in linkage with the forming jigs 320 and 320', thereby cutting the duct 10 and enabling the forming of the upper and lower vanes 11 and 11' of the duct 10.

The eccentric shaft member 512 may be a component that includes an eccentric protrusion 512a formed at a location eccentric from the center of the upper part of the eccentric shaft member 512 to be coupled to a central portion of the eccentric rotary roller 511 and includes a main shaft 512b formed at the center of the lower part of the eccentric shaft member 512. The eccentric shaft member 512 may allow the eccentric rotary roller 511 to eccentrically rotate by the rotation of the main shaft 512b.

The rotary housing member 513 may be a component that has a seating groove 513a recessively formed in the upper part thereof to allow the eccentric rotary roller 511 to be seated therein and includes a guide flange 513b formed at the lower part thereof to allow the main shaft 512b to be inserted therein.

Meanwhile, a first gear 514 may be provided on the lower outer circumference of the rotary housing member 513, and a second gear 515 may be provided on the lower outer circumference of the main shaft 512b.

The guide shaft 518 may be connected to the second driving member 520 to deliver the torque of the second driving member 520 to the first driving member 510. To this end, a third gear 516 may be provided on the outer circumference of the guide shaft 518 so as to operate in linkage with the first gear 514, and a fourth gear 517 may be provided so as to operate in linkage with the second gear 515.

Figure 10:
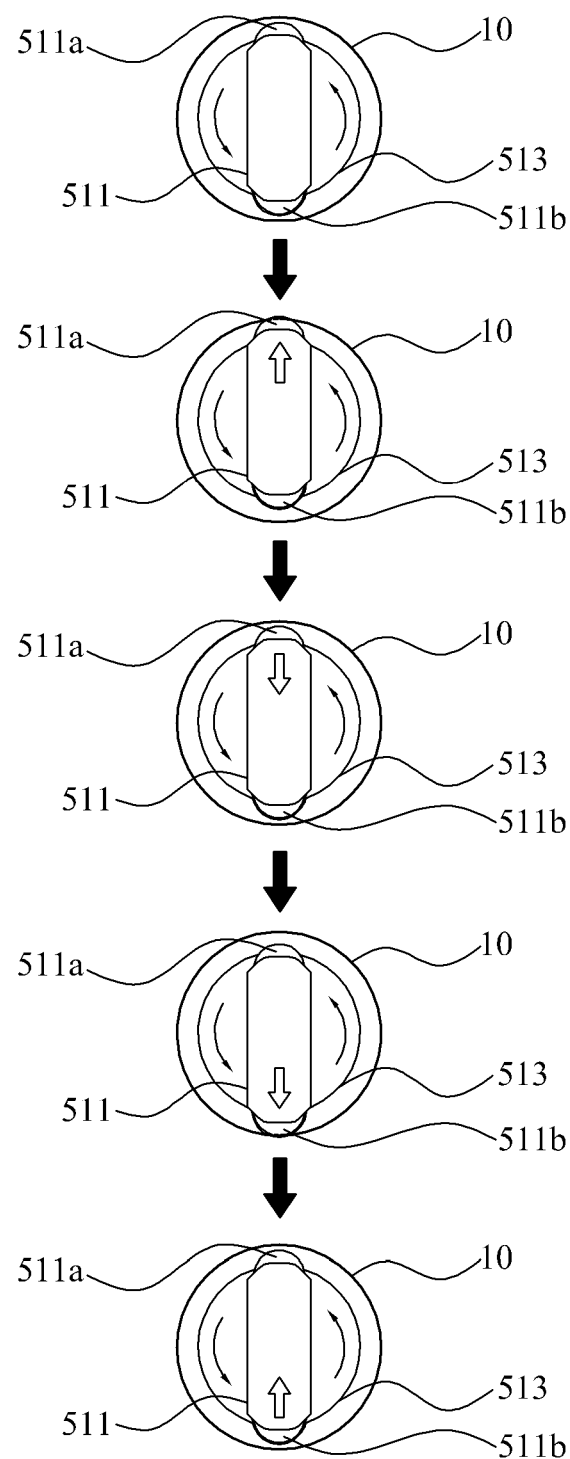
FIG. 10 is a schematic view illustrating a rotating operation of an eccentric rotary roller of an elbow-shaped duct manufacturing apparatus according to an exemplary embodiment of the present invention.

In this embodiment, assuming that the first gear 514 rotates 30 times a cycle by forming a first gear ratio with the third gear 516 which is larger than a second gear ratio of the second gear 515 and the fourth gear 517 so that the second gear 515 may be configured to rotate 31 times in one cycle and thus further rotate one more time per cycle than the first gear 514. Thus, when the first gear 514 rotates one time, the second gear 515 may further rotate a little more than the first gear 514. As shown in FIG. 10, when the eccentric rotary roller 511 rotates, the cutting roller 511a may make close contact with the inner circumference of the duct 10 and cut the duct 10, and after certain rotation, the cutting roller 511a may return to the original location. Thereafter, the forming roller 511b may make close contact with the cut duct 10 and push and press the duct 10 to the duct vane forming parts 321 and 321', thereby forming the upper and lower vanes 11 and 11' of the duct 10. Thereafter, when the eccentric rotary roller 511 stops rotating, the forming roller 511b may return to the original location.

Meanwhile, an inclination gear 519 may be disposed at a lower portion of the guide shaft 518, and thus the inclination gear 519 and a spur gear 522 that is disposed at an upper portion of the motor connecting shaft 521 disposed inside the second driving member 520 may be connected to each other. Thus, a torque may be delivered to the first driving member 510 through the second driving member 520 to which a torque generated by the driving of a motor part (not shown) is applied.

Hereinafter, a manufacturing process of an elbow-shaped duct manufacturing apparatus 1 according to an exemplary embodiment of the present invention will be described in detail with reference to FIGS. 11 to 13.

Figure 11:
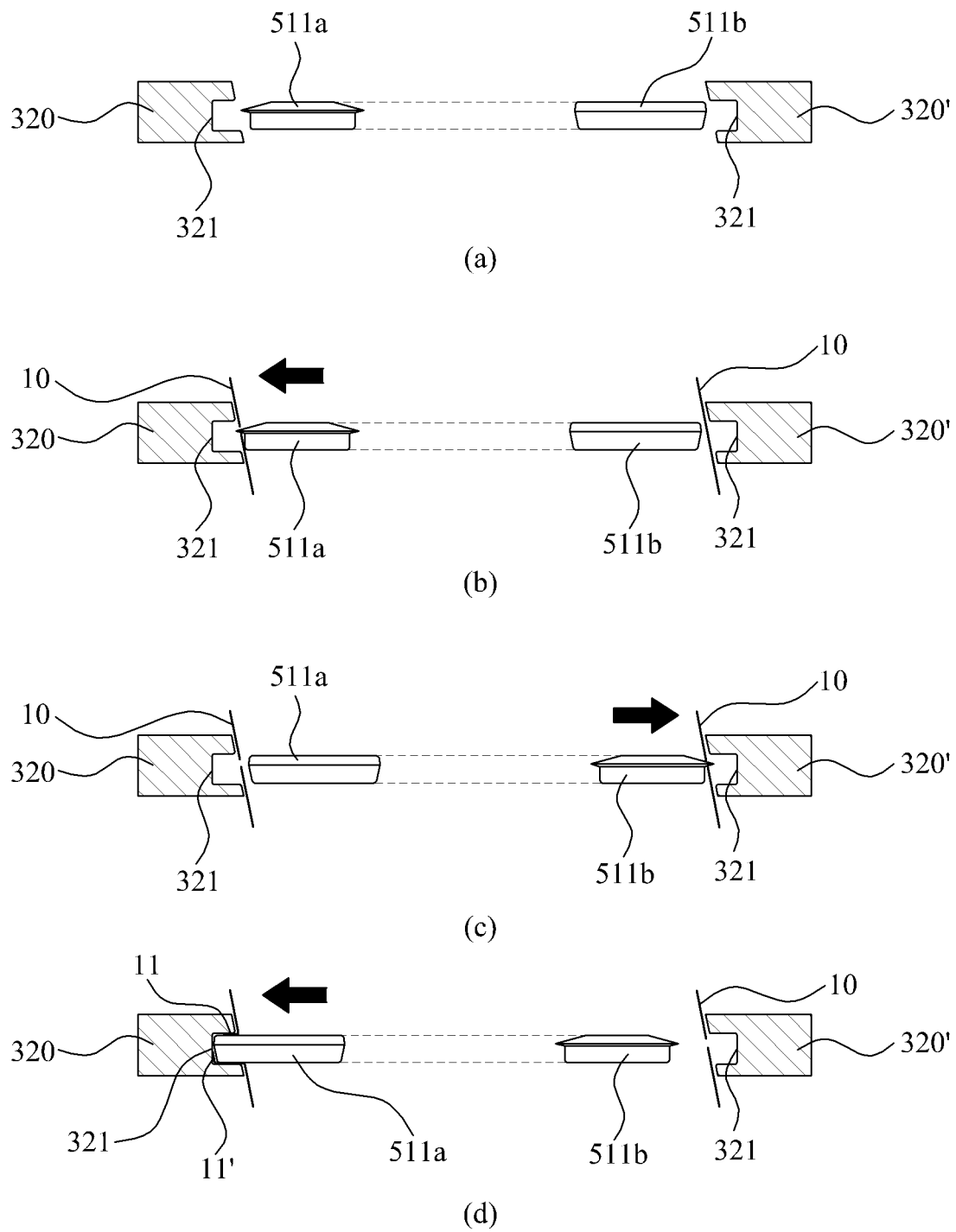
FIG. 11 is a view illustrating manufacturing and coupling of upper and lower vanes of a duct using an elbow-shaped duct manufacturing apparatus according to an exemplary embodiment of the present invention.
Figure 12:
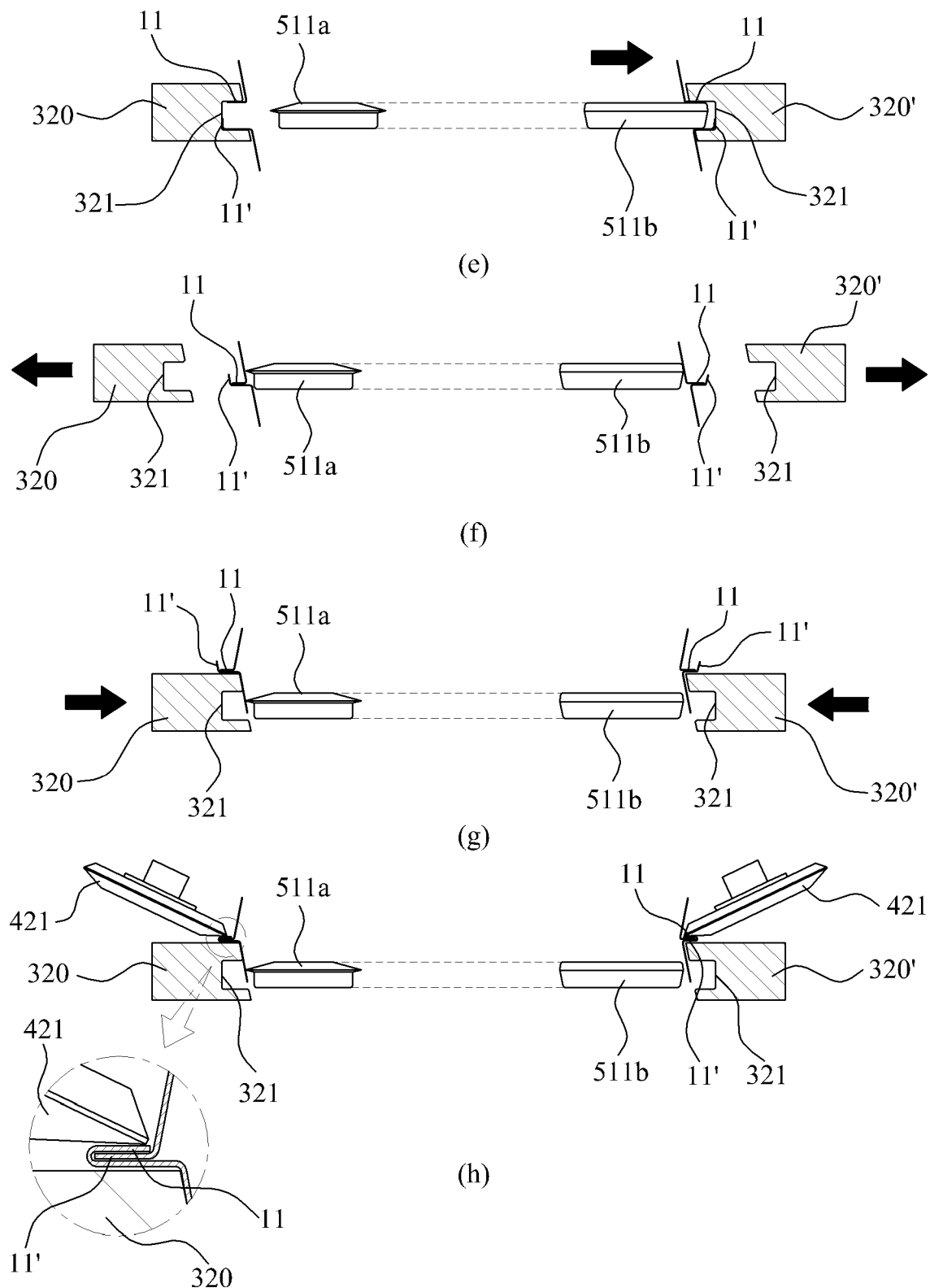
FIG. 12 is a view illustrating manufacturing and coupling of upper and lower vanes of a duct using an elbow-shaped duct manufacturing apparatus according to an exemplary embodiment of the present invention.
Figure 13:
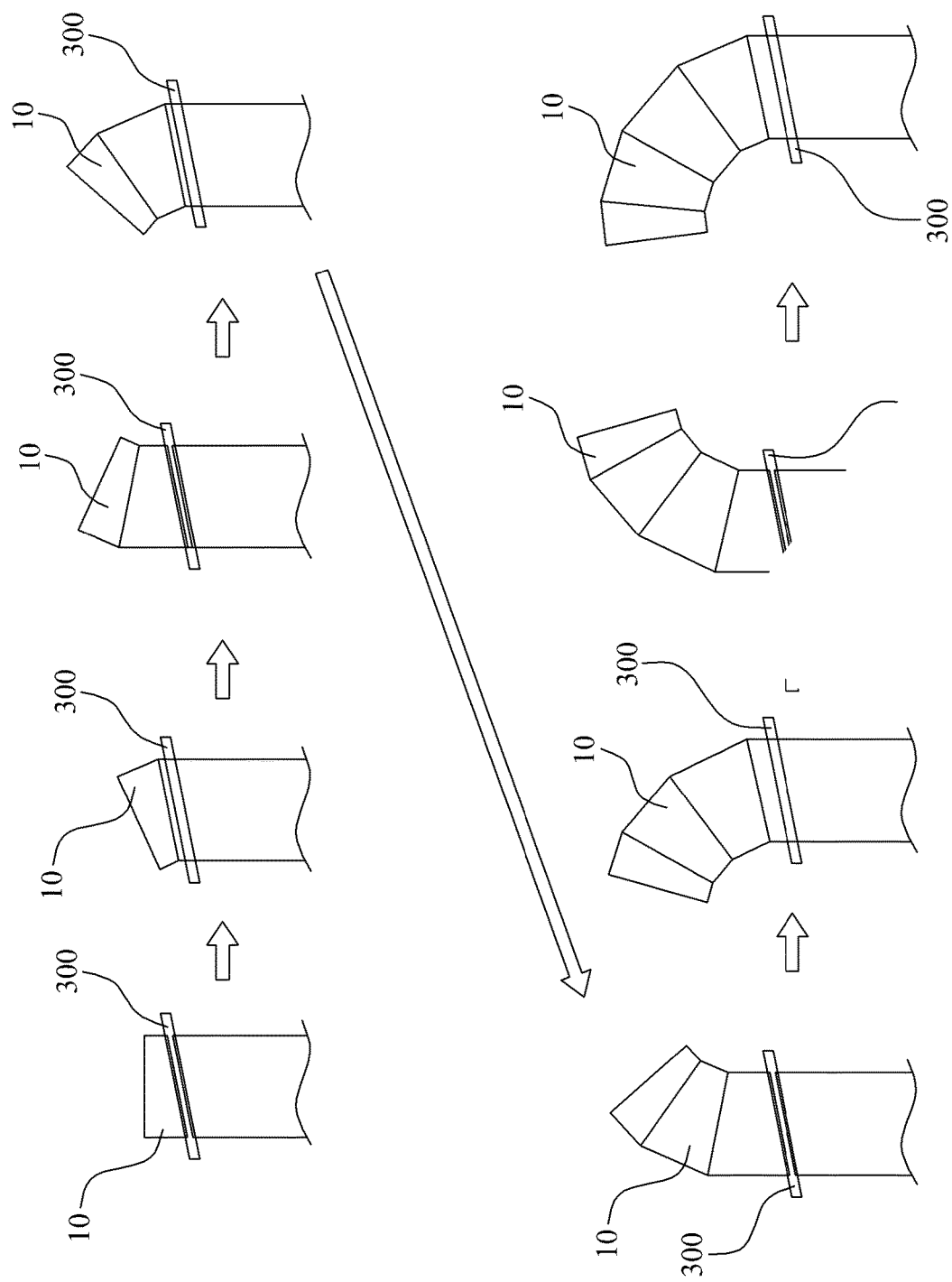
FIG. 13 is a schematic view illustrating a process of manufacturing a duct into an elbow shape using an elbow-shaped duct manufacturing apparatus according to an exemplary embodiment of the present invention.

Referring to FIGS. 11 and 12, in the manufacturing process of the elbow-shaped duct manufacturing apparatus, the duct movement guiding part 200 on which the duct 10 is seated may be first moved upward by a certain range.

In this case, the forming jigs 320 and 320' may be in a state spaced to each other until the duct 10 passes the fifth hollow 310. Thereafter, when the duct 10 passes the fifth hollow 310 and then stops, the forming jigs 320 and 320' may slide forward in an inward direction, and may bring the outer circumference of the duct 10 into contact with the semicircular parts 320a and 320b to fix the duct 10.

Thereafter, the duct fixing member 410 may be moved forward, and thus the support bracket 411 may also be brought into contact with the outer circumference of the duct to fix the duct 10 like the forming jigs 320 and 320'.

When the duct 10 is fixed, the rotary driving part 500 may be operated to eccentrically rotate the eccentric rotary roller 511. The duct 10 may be first duct by the cutting roller 511a of the eccentric rotary roller 511 that is eccentrically rotated, and then the duct 10 that is cut may be pushed and pressed to the duct vane forming parts 321 and 321' by the forming roller 511b of the eccentric rotary roller 511 to form the upper and lower vanes 11 and 11' of the duct 10.

In this case, since the forming jigs 320 and 320' and the eccentric rotary roller 511 incline at a certain angle, one side of the duct 10 may be cut into a narrow width, and the other side thereof may be cut into a wide width. Thus, as shown in FIG. 13, the duct 10 may have an obliquely cut shape when viewed from the front.

Meanwhile, when the cutting and forming of the duct 10 are completed, an upper portion of the duct 10 over the cut surface may be maintained at a fixed state by the duct fixing member 410, and the forming jigs 320 and 320' that are fixing a lower portion of the duct under the cut surface may be moved backward to release the fixing of the duct 10.

Thereafter, the portion of the duct 10 under the cut surface may be moved upward by operating the duct movement guiding part 200. In this case, the duct 10 may be moved such that the horizontal part of the lower vane 11' of the duct 10 can make contact with the upper portions of the forming jigs 320 and 320' to be seated thereon.

After the lower portion of the duct 10 that is cut is moved as described above, the forming jigs 320 and 320' may slide forward in an inward direction, and thus may bring the outer circumference of the lower portion of the duct 10, which is cut, into contact with the semicircular parts 320a and 320b to fix the duct 10. In this case, it may be desirable that the horizontal part of the lower vane 11' of the duct 10 can make contact with the upper portions of the forming jigs 320 and 320'.

Thereafter, the duct seating member 210 and the circular rotation plate 401 may be together rotated, and then the duct fixing member 410 that is fixing the upper portion of the duct 10 that is cut may be moved backward to release the fixing of the duct 10. Thereafter, the duct vane pressing member 420 may be moved forward such that the pressing roller 421 can press the vertical part of the lower vane 11' of the duct 10.

In this case, the pressing roller 421 may press the vertical part of the lower vane 11' of the duct 10, and simultaneously may rotate the circular rotation plate 401 to press the whole of the vertical part of the lower vane 11' of the duct 10 which is formed around the duct, thereby enabling the cut duct 10 to be integrally formed.

Thereafter, the forming jigs 320 and 320' fixing the lower portion of the duct 10 that is cut may be moved backward to release the fixing of the duct 10, and then the duct seating member 210 may be rotated about 180 degrees, and the forming jigs 320 and 320' and the duct fixing member 410 may be again moved forward to fix the duct 10. Thereafter, the cutting and forming of the duct 10 may be repeated using the eccentric rotary roller 511.

When the cutting and forming of the duct 10 is repeated, one side surface of the duct 10 may be gradually cut into a narrower width, and the other side surface of the duct 10 may be gradually cut into a wider width, thereby completing an elbow-shaped duct.

In this embodiment, since a forming guide jig 530 described later is omitted, the manufacturing cost and the manufacturing time for product assembly can be reduced due to the omission of the forming guide jig 530.

Figure 14:
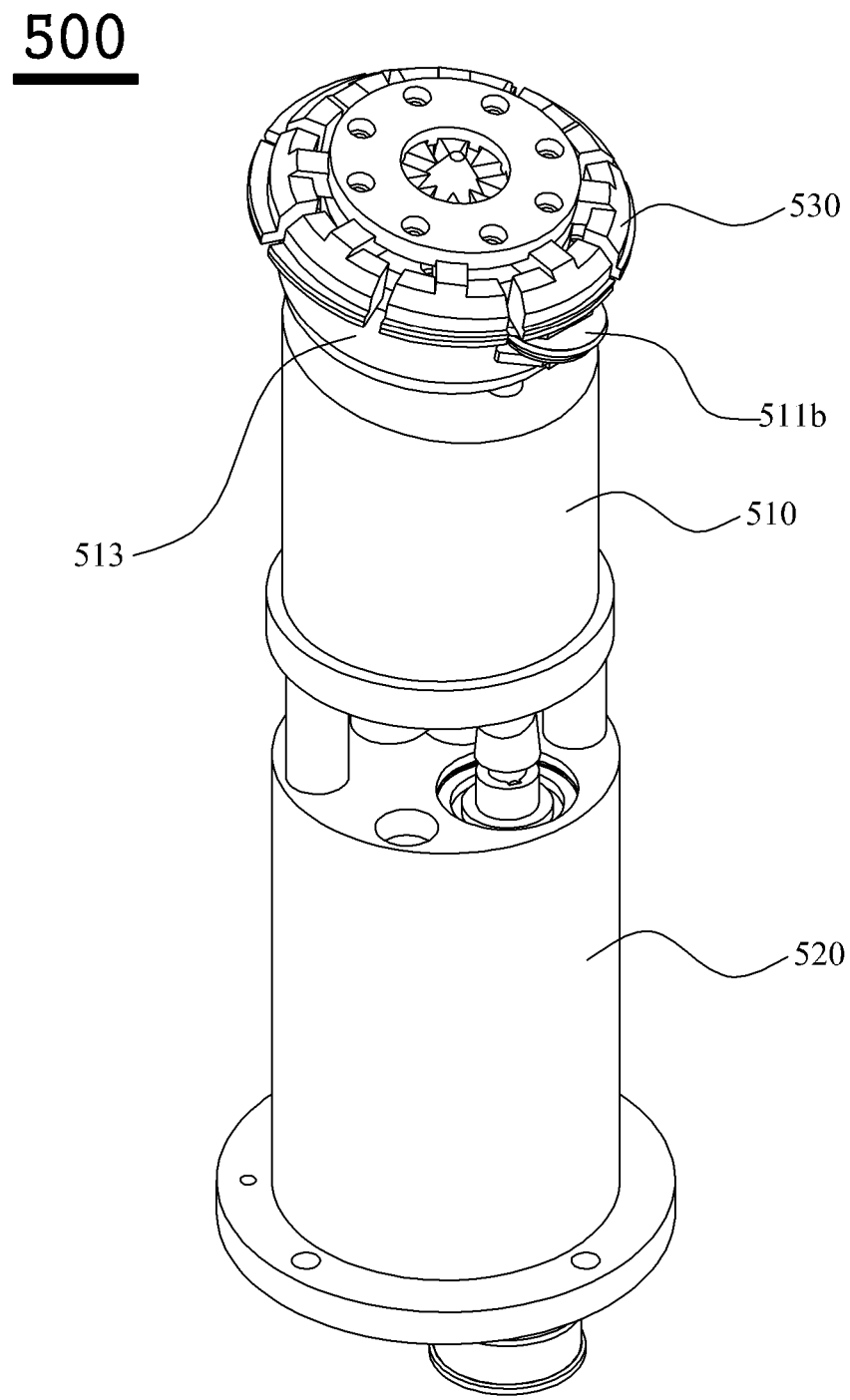
FIG. 14 is a perspective view illustrating a rotary driving part of an elbow-shaped duct manufacturing apparatus including a forming guide jig according to an exemplary embodiment of the present invention.
Figure 15:
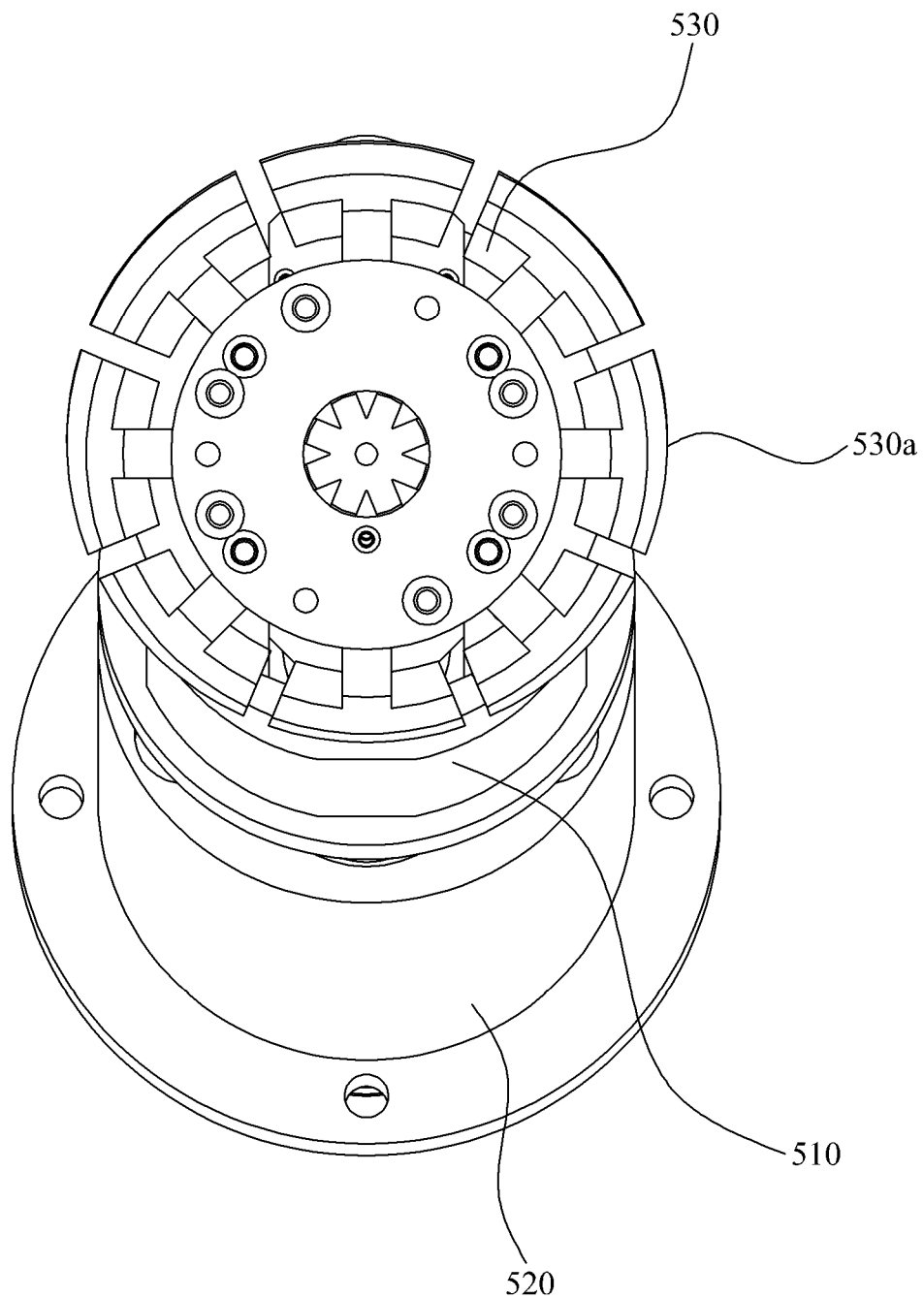
FIG. 15 is a plan view illustrating a forming guide jig of an elbow-shaped duct manufacturing apparatus according to an exemplary embodiment of the present invention.
Figure 16:
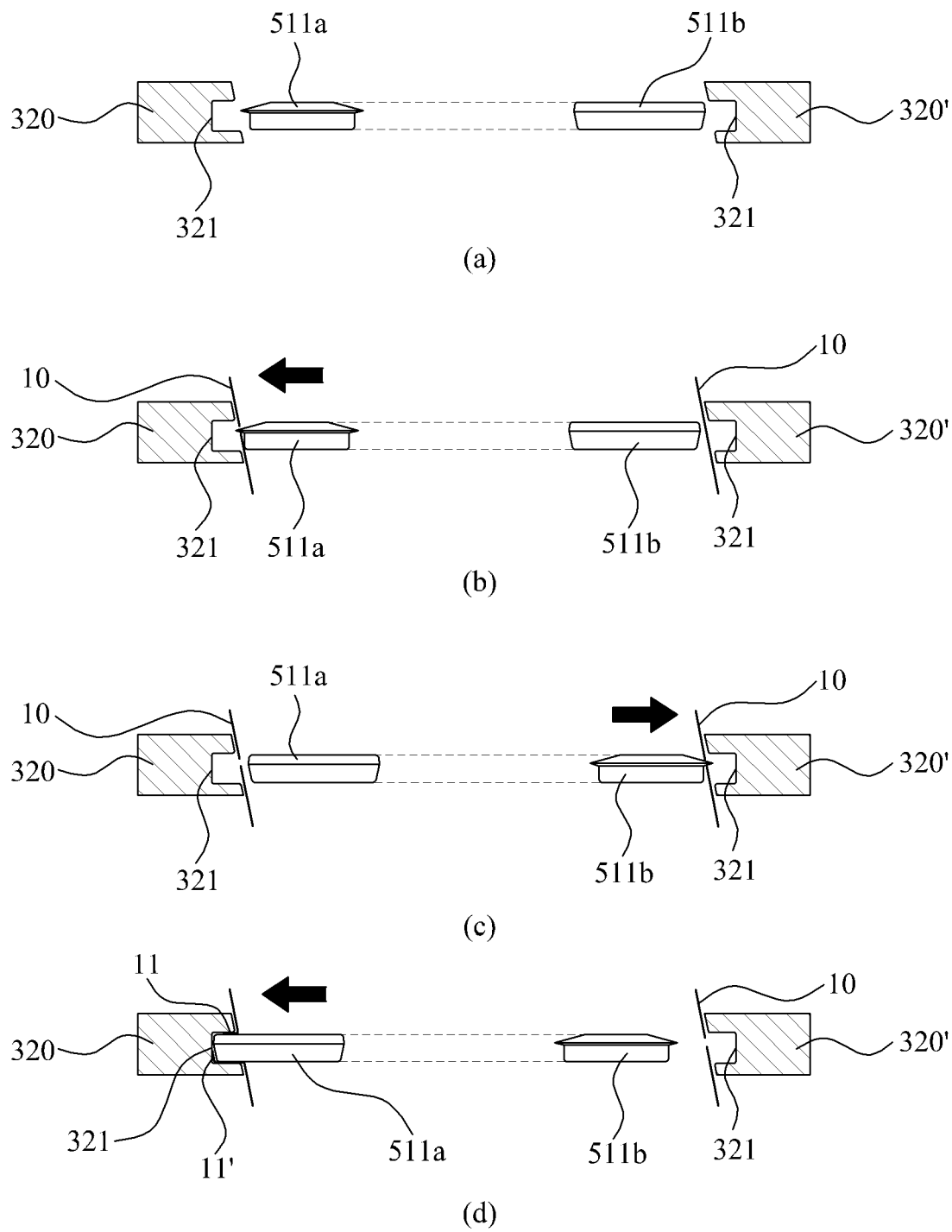
FIG. 16 is a view illustrating manufacturing and coupling of upper and lower vanes of a duct using a forming guide jig of an elbow-shaped duct manufacturing apparatus according to another exemplary embodiment of the present invention.

Meanwhile, as shown in FIG. 14 or 15, the forming guide jig 530 supporting the inner circumferential surface of the duct 10 may be disposed when the upper and lower vanes 11 and 11' of the duct 10 are bound by the duct vane pressing member 420 by being installed over the eccentric rotary roller 511 so as to be vertically movable and be movable forward and backward in a horizontal direction. An asymmetrical support member 530a having different shapes by section may be disposed around the outer side of the forming guide jig 530.

The asymmetrical support member 530 may be disposed inside the duct 10, and the duct 10 may have a structure that is manufactured into an elbow shape in which one side of the duct 10 is cut into a narrow width and the other side thereof is cut into a wide width when the upper and lower vanes 11 and 11' of the duct 10 is bound. Accordingly, since one side and the other side of the duct 10 are bent in the same direction, the inner side surface of the binding portion of the upper and lower vanes 11 and 11' of the duct 10 may be formed in accordance with the corresponding inner circumferential surface of the duct 10 by section so as to compatible with the whole circumference of the inner circumferential surface of the duct 10. Thus, the upper and lower vanes 11 and 11' of the duct 10 can be more closely and stably bound.

Figure 17:
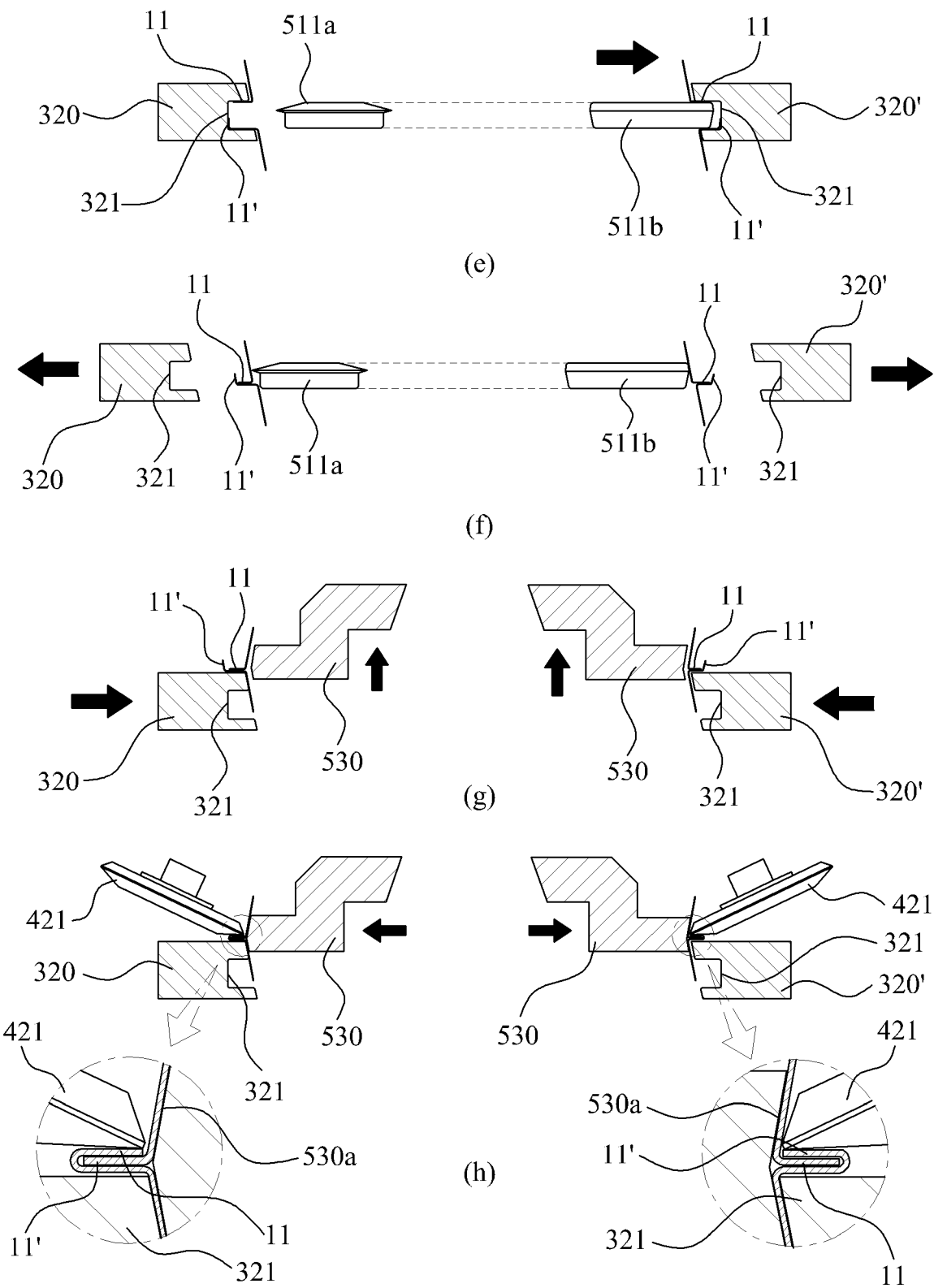
FIG. 17 is a view illustrating manufacturing and coupling of upper and lower vanes of a duct using a forming guide jig of an elbow-shaped duct manufacturing apparatus according to another exemplary embodiment of the present invention.

In the subsequent process, when the pressing roller 421 presses the vertical part of the lower vane 11' of the duct 10, and simultaneously rotates the circular rotation plate 401 to press the whole of the vertical part of the lower vane 11' of the duct 10 which is formed around the duct 10, the forming guide jig 530 disposed inside the duct 10 may be moved upward, and then may be moved forward in a horizontal direction to adhere the forming guide jig 530 closely to the inner circumferential surface of the duct 10. In this case, as shown in FIG. 17H, in case of the duct 10 which is bent in the right direction on the drawing, the asymmetrical support member 530a having the same shape as the inner circumference of the duct 10 may adhere the duct 10 closely, and thus the vanes 11 and 11' of the duct 10 can be more closely and stably bound, enabling the duct 10 to be integrally formed.

Like another exemplary embodiment of the present invention, when the forming guide jig 530 is provided, it may be possible to prevent the duct 10 from moving when the upper and lower vanes 11 and 11' of the duct 10 are bound by the duct vane pressing member 420. Thus, a more precise and combinative elbow-shaped duct can be provided.

As described above, optimal embodiments have been disclosed in the drawings and the specification. Although specific terms have been used herein, these are only intended to describe the present invention and are not intended to limit the meanings of the terms or to restrict the scope of the present invention as disclosed in the accompanying claims. Therefore, those skilled in the art will appreciate that various modifications and other equivalent embodiments are possible from the above embodiments. Therefore, the scope of the present invention should be defined by the technical spirit of the accompanying claims.

The invention claimed is:

1. An apparatus for manufacturing an elbow-shaped duct, comprising:
    a main body (100) comprising a first support (110) and a second support (120), an inclined housing tube (130) disposed above and coupled to the second support (120), and an inclined member (132) obliquely coupled to an upper portion of the inclined housing tube (130);
    a duct movement guiding part (200) coupled to the second support (120) so as to be rotatable and vertically movable and comprising a duct seating member (210);
    a duct vane forming part (300) coupled to the inclined member (132) and comprising forming jigs (320 and 320') symmetrically disposed to slide in opposite directions, respectively, and comprising semicircular parts (310a and 310b) having a semi-circular shape;
    a duct vane coupling part (400) rotatably coupled to the first support (110) and comprising a duct fixing member (410) and a duct vane pressing member (420) coupling an upper vane (11) and a lower vane (11') of a duct (10); and
    a rotary driving part (500) rotatably disposed inside the main body (100), and comprising a first driving member (510) comprising an eccentric rotary roller (511) that comprises a cutting roller (511a) for cutting the duct (10) and a forming roller (511b) for forming the upper vane (11) and the lower vane (11') of the duct (10) and the rotary driving part (500) further comprising a second driving member (520).

2. The apparatus of claim 1, wherein the first driving member (510) comprises:
    an eccentric shaft member (512) comprising an eccentric protrusion (512a) formed at a location eccentric from a rotation center of an upper part of the eccentric shaft member (512) and coupled to a central portion of the eccentric rotary roller (511) and a main shaft (512b) formed at a lower part of the eccentric shaft member (512);
    a rotary housing member (513) having a seating groove (513a) recessively formed in an upper part thereof to allow the eccentric rotary roller (511) to be seated therein and comprising a guide flange (513b) formed at a lower part thereof to allow the main shaft (512b) to be inserted therein.

3. The apparatus of claim 2, further comprising a first gear (514) and a third gear (516), the first gear (514) and the third gear (516) having a first gear ratio larger than a second gear ratio between a second gear (515) and a fourth gear (517).

4. The apparatus of claim 3, wherein the main body (100) further comprises a hydraulic reel member (140) coupled to the main body (100).

5. The apparatus of claim 4, further comprising shape forming members (321 and 321') recessively formed inside the semicircular parts (310a and 310b), and
    a forming guide jig (530) disposed at an upper part of the eccentric rotary roller (511).

* * * * *